United States Patent [19]
Bonyhard et al.

[11] Patent Number: 5,495,378
[45] Date of Patent: Feb. 27, 1996

[54] MAGNETORESISTIVE SENSOR WITH IMPROVED PERFORMANCE AND PROCESSABILITY

[75] Inventors: Peter I. Bonyhard, Scotts Valley, Calif.; James F. Dolejsi, Chanhassen, Minn.; Charles H. Tolman, Bloomington, Minn.; William P. Wood, Edina, Minn.

[73] Assignee: Seagate Technology, Inc., Scotts Valley, Calif.

[21] Appl. No.: 380,820

[22] Filed: Jan. 30, 1995

[51] Int. Cl.⁶ .................................................. G11B 5/39
[52] U.S. Cl. .................................................. 360/113
[58] Field of Search .................................................. 360/113

[56] References Cited

U.S. PATENT DOCUMENTS

| | | | |
|---|---|---|---|
| 4,785,366 | 11/1988 | Krounbi et al. | 360/113 |
| 4,879,619 | 11/1989 | Fontana, Jr. et al. | 360/113 |
| 5,005,096 | 4/1991 | Krounbi et al. | 360/113 |
| 5,260,652 | 11/1993 | Collver et al. | 324/252 |

Primary Examiner—John H. Wolff
Attorney, Agent, or Firm—Kinney & Lange

[57] ABSTRACT

An MR sensor having improved current density distribution, reduced overall resistance and a substantially planar surface is disclosed. The MR sensor includes an MR layer having first and second outer regions and an active region located between the first and second outer regions. A first permanent magnet region is formed upon the first MR layer outer region and defines a first boundary of the MR layer active region. A second permanent magnet region is formed upon the second MR layer outer region and defines a second boundary of the MR layer active region so that a gap region is positioned at least partially between the first and second permanent magnet regions. A spacer layer is formed on the MR layer active region between the first and second permanent magnet regions. A soft adjacent layer is formed in the active region and upon the spacer layer, and, in some preferred embodiments, also at least partially upon the permanent magnet region.

15 Claims, 9 Drawing Sheets

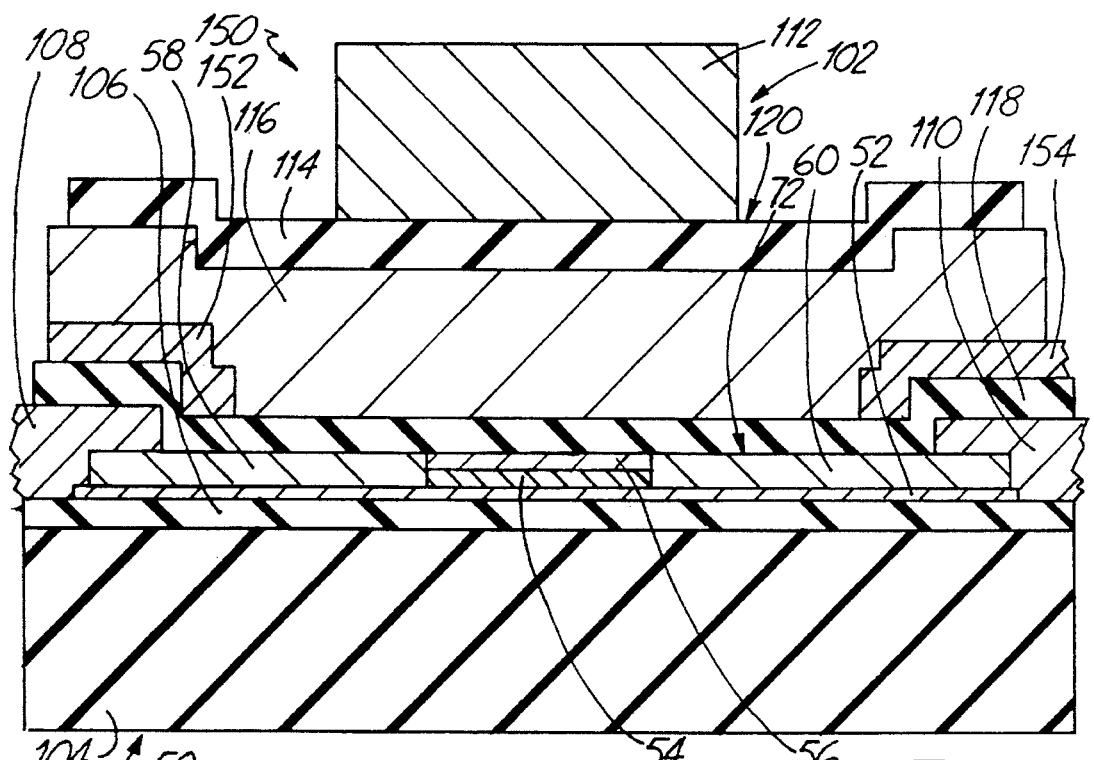
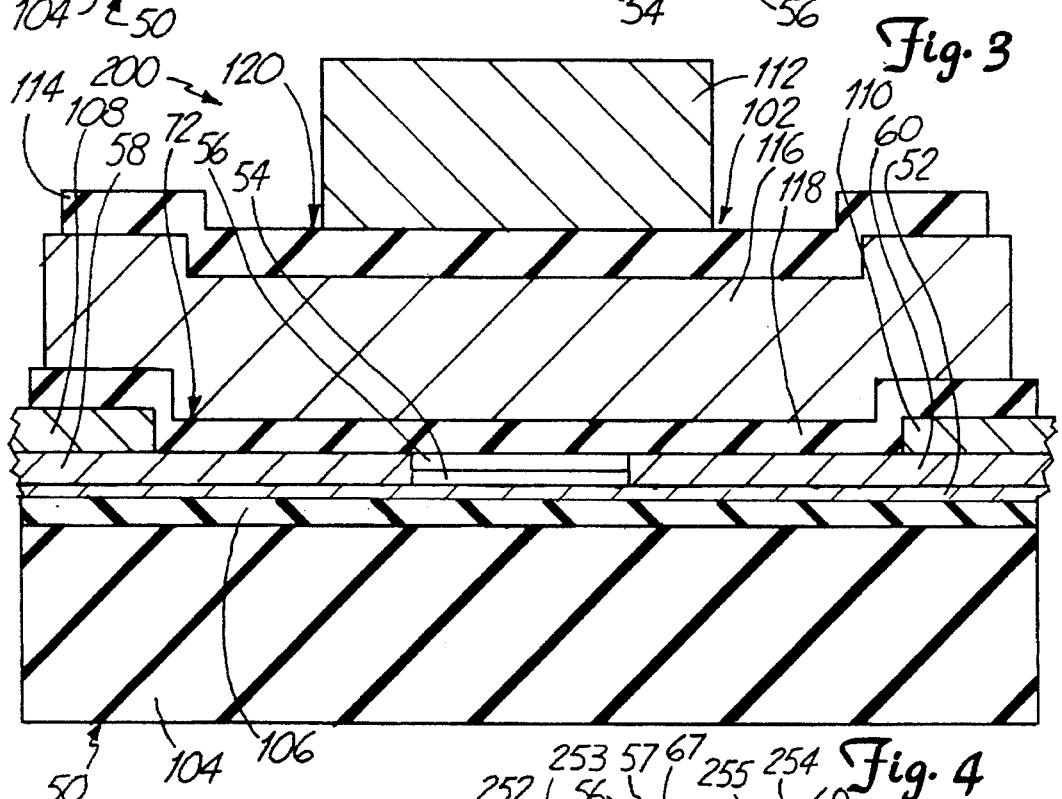
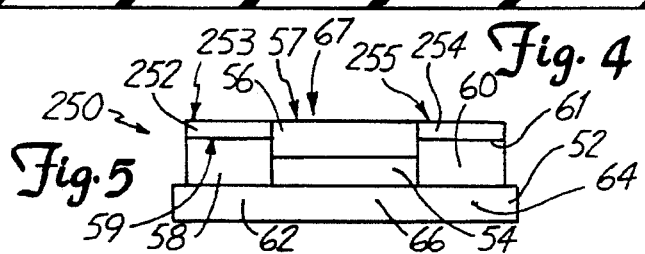

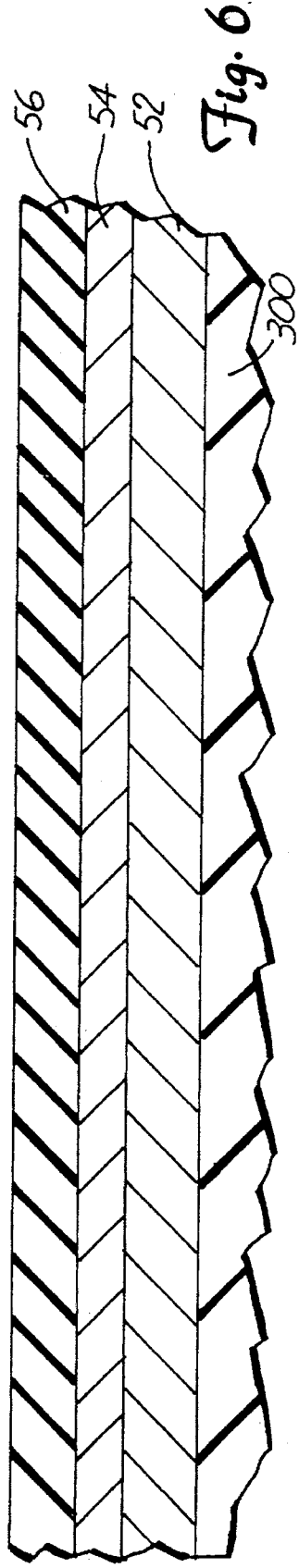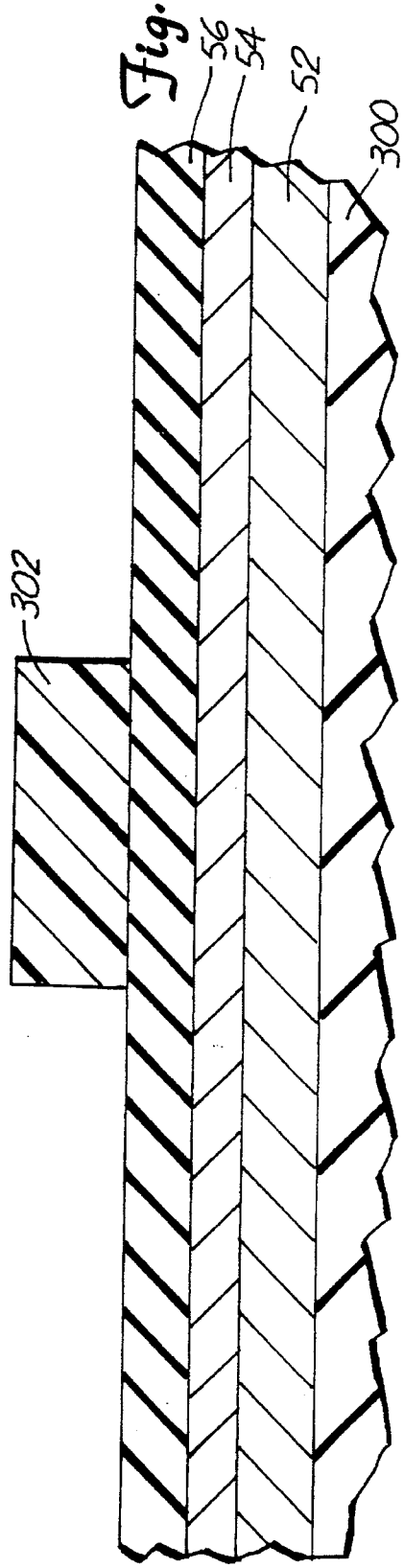

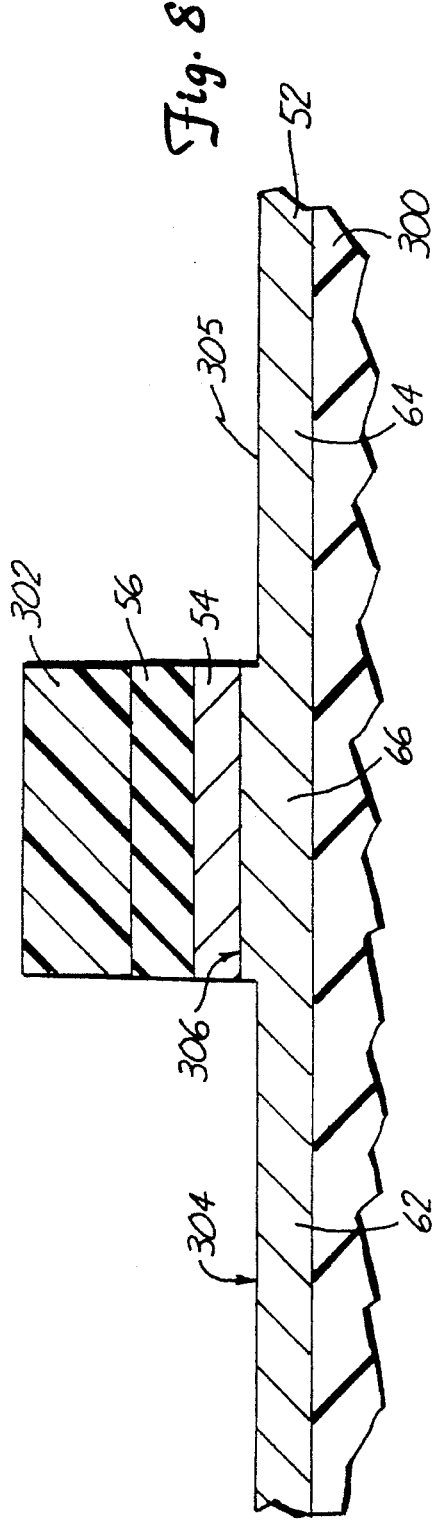
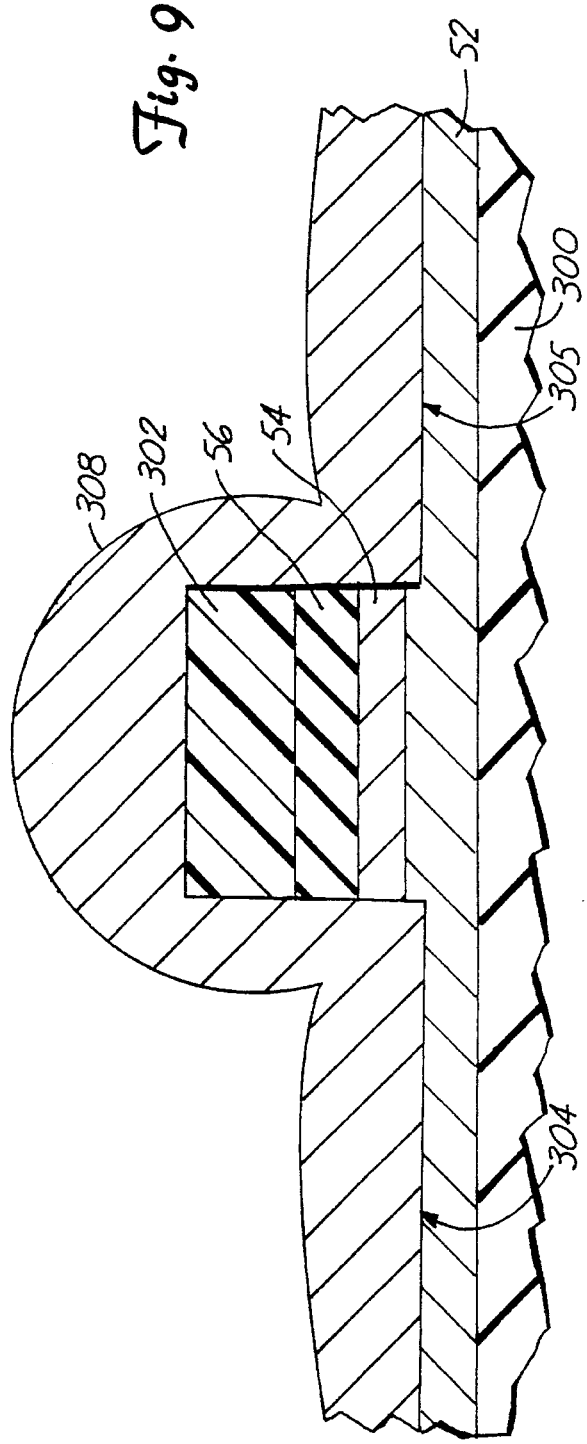

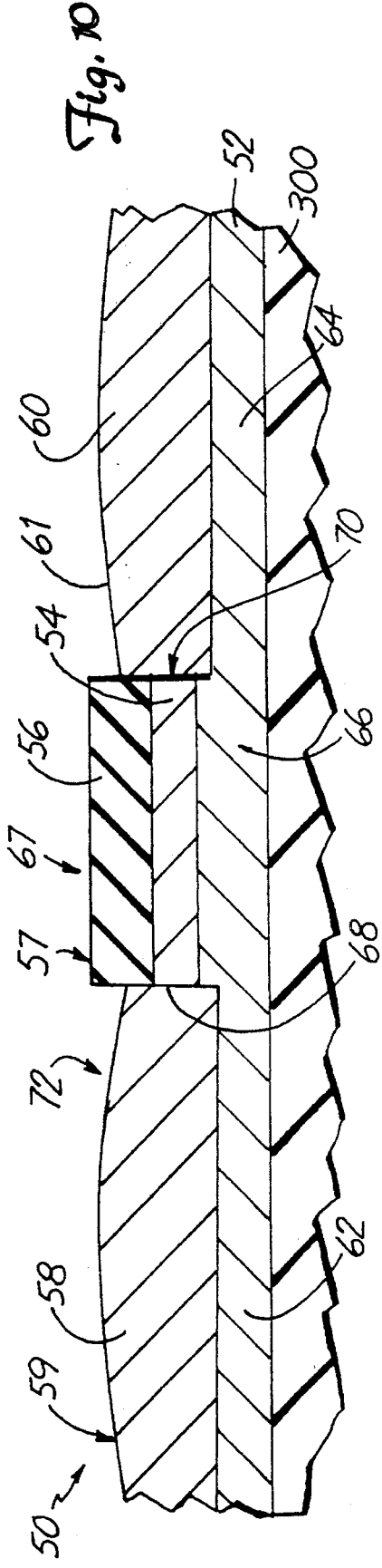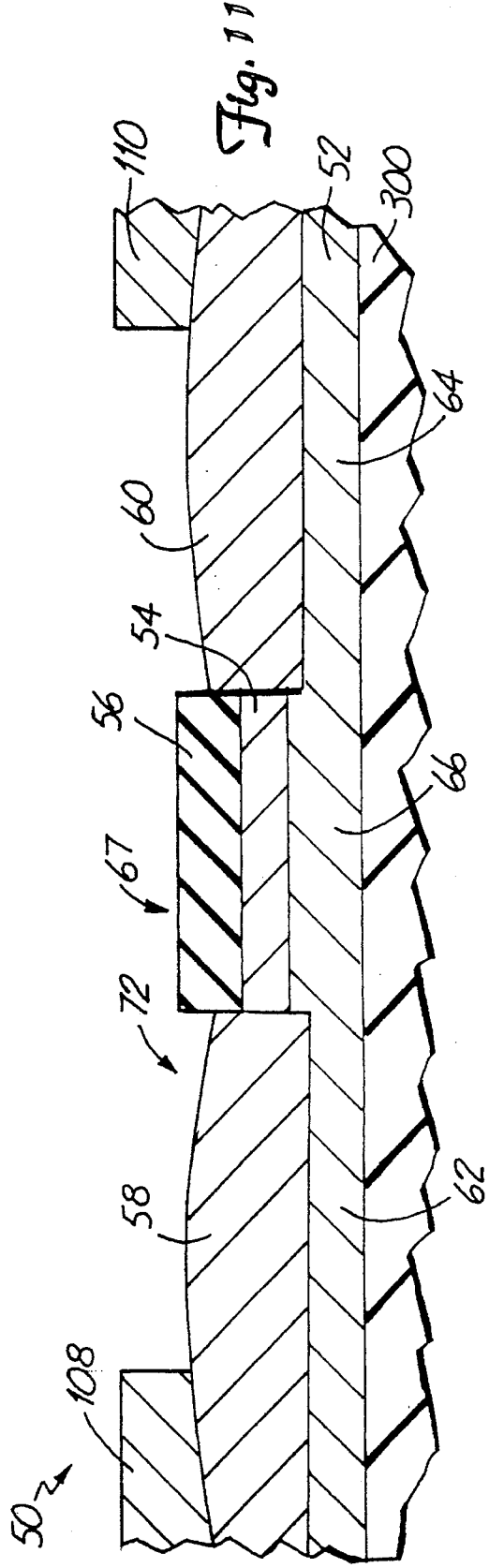

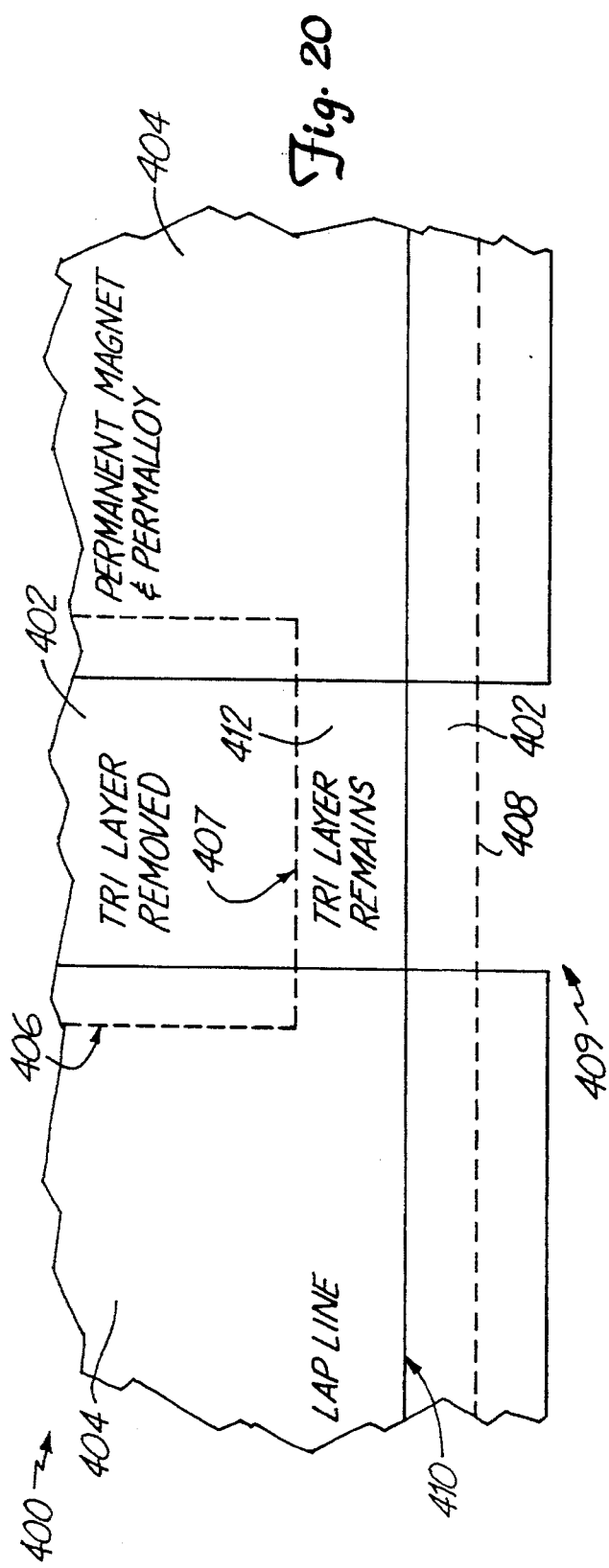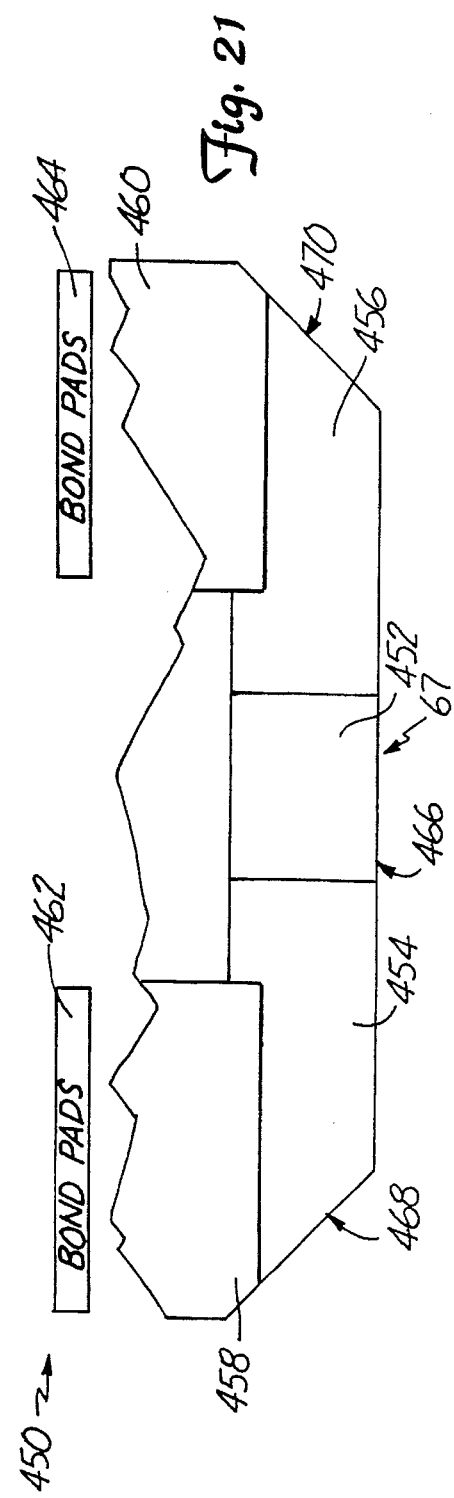

MAGNETORESISTIVE SENSOR WITH IMPROVED PERFORMANCE AND PROCESSABILITY

BACKGROUND OF THE INVENTION

The present invention is a magnetoresistive (MR) sensor. More specifically, the present invention is an MR sensor having improved operational characteristics and significant processing advantages.

MR sensors or heads are used to read magnetically encoded information from a magnetic medium by detecting magnetic flux stored in the magnetic medium. During the operation of an MR sensor, a sense current is passed through the MR element of the sensor, causing a voltage drop. The magnitude of the voltage drop is a function of the resistance of the MR element. The resistance of the MR element varies in the presence of a magnetic field. Therefore, as the magnitude of the flux from a transition in a magnetic layer on a disc passing through the MR element varies, the voltage across the MR element also varies. Differences in the magnitude of the magnetic flux entering the MR sensor can be detected by monitoring the voltage across the MR element.

An MR sensor will provide an approximately linear output when the magnetization vector M of the MR element and the current density vector J of the MR element form an angle of approximately 45 degrees. An approximately linear response is achieved when these two vectors form an angle of near 45 degrees. Permalloy, a typical MR element material and an alloy of nickel and iron, will naturally tend to form a magnetization vector along its long axis when it is formed into a long narrow strip. This alignment is enhanced by a field induced anisotrophy formed during the deposition of the permalloy element. The current density vector is also typically oriented in this same direction. By forming a soft adjacent layer (SAL) near the MR element and in a parallel plane to the MR element, the magnetization vector can be rotated at 45 degrees with respect to the long axis. Therefore, if the current density vector points in the same direction as the magnetization vector pointed prior to rotation, the addition of a proper SAL will cause the output of the sensor to be nearly linearly related to the magnitude of the magnetic flux entering the MR element.

MR elements can "fracture" into multiple magnetic domains when they are exposed to an external magnetic field. To maximize the MR sensor's output and stability, it is desirable to maintain the MR element in a single domain state. Two methods for maintaining an MR element in a single domain state are hard biasing and exchange coupling. Hard biasing is accomplished by positioning a permanent magnet adjacent to the MR element. Exchange coupling occurs by depositing an antiferromagnetic layer on the MR layer so that one of the magnetic lattices of the antiferromagnetic layer couples with the magnetic lattice of the MR element layer to help preserve the single domain state of the sensor. Both hard biasing and exchange coupling can be used together.

In existing MR sensors, alignmnent tolerances between various thin film layers and MR sensor mask features are critical. For instance, in some MR sensor designs, the active region is defined by the placement of the contacts (or conductors). The criticality of alignment in many prior art MR sensor designs greatly increases the complexity of processing because critical geometries frequently require additional or more difficult processing steps.

There is another significant factor that adds to the complexity of prior art MR sensor designs. In magnetic sensor designs which include a separate inductive write head or transducer, the inductive write head is typically fabricated on top of the MR sensor in subsequent deposition steps. The write gap of the inductive write head must be substantially planar in order to achieve optimum results. In prior art MR sensors, planarization processing steps after fabrication of the MR sensor have been necessary to obtain a planar surface on which to deposit the write head thin film layers. As a result, many prior art MR sensor designs require additional layers and/or complex planarization techniques to achieve a planar write gap. Also, many prior art MR sensor designs have an increased separation between the reader and the writer.

In many existing MR sensors, the permanent magnet regions are placed on the sides of the MR element. In those designs, the active region of the MR element is typically defined by conductors or contacts which are placed above the MR element. However, problems arise when the active region is defined by conductors. One such problem is that the regions under the conductors near the air bearing surface absorb magnetic flux and adversely affect the reading by the MR sensor. Another problem is that the placement of the conductors can increase the complexity of processing steps aimed at planarizing the MR sensor for subsequent deposition of the inductive write sensor.

SUMMARY OF THE INVENTION

The present invention is an improved MR sensor. The MR sensor of the present invention includes an MR layer having first and second outer regions and an active region located between the first and second outer regions. A first permanent magnet region is formed upon the first MR layer outer region and defines a first boundary of a gap region above the MR layer active region. A second permanent magnet region is formed upon the second MR layer outer region and defines a second boundary of the gap region above the MR layer active region so that the gap region is positioned at least partially between the first and second permanent magnet regions. A spacer layer is formed on the MR layer active region in the gap region between the first and second permanent magnet regions. A soft adjacent layer is formed at least partially in the gap region and upon the spacer layer.

In some preferred embodiments of the present invention, the first and second permanent magnet regions and the SAL form a substantially planar MR sensor surface on which an inductive write head can be fabricated. The active region of the MR sensor is defined by the location of the permanent regions. The thick conductor layers are not used to define the active region and can therefore be removed (i.e. moved away) from the active region of the sensor. This allows the MR sensor's planar surface to be maintained.

In other preferred embodiments of the present invention, the SAL is only partially formed above the spacer layer in the gap region of the sensor. Other portions of the SAL are formed on top of the first and second permanent magnet regions in order to provide an additional current path across the gap region of the MR sensor. This alternate current path reduces the high current densities in portions of the MR layer which might result from poor electrical contact between the permanent magnet regions and layers in the gap region.

BRIEF DESCRIPTION OF THE DRAWINGS

FIG. 3 is a sectional view of a second magnetic device having an inductive write head fabricated on top of an MR sensor in accordance with the present invention.

FIG. 4 is a sectional view of a third magnetic device having an inductive write head fabricated on top of an MR sensor in accordance with the present invention.

FIG. 5 is a sectional view of a portion of an alternate MR sensor configuration in accordance with preferred embodiments of the present invention.

FIGS. 6–11 are cross-sectional views showing a method of forming the MR sensor of FIG. 1.

FIG. 20 is a diagrammatic view illustrating certain advantageous features of the MR sensors of the present invention.

FIG. 21 is a diagrammatic view illustrating further advantageous features of the MR sensors of the present invention.

DETAILED DESCRIPTION OF THE PREFERRED EMBODIMENTS

Figure 1:
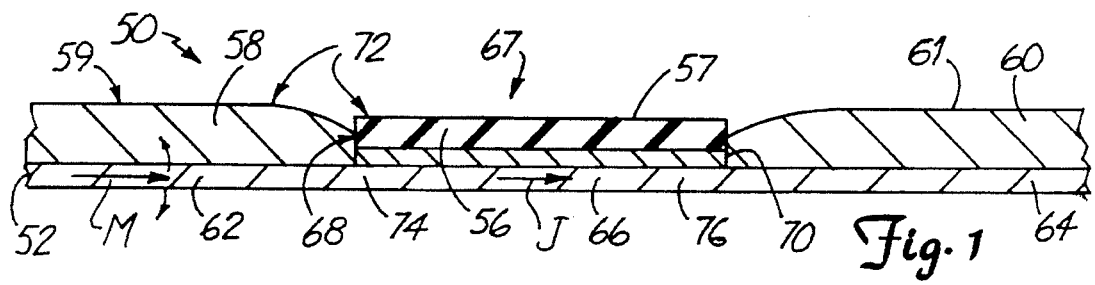
FIG. 1 is a sectional view of a first MR sensor configuration in accordance with preferred embodiments of the present invention.

FIG. 1 is a sectional view of magnetoresistive (MR) head or sensor 50. The sectional view shown in FIG. 1 is taken from a plane parallel to the air bearing surface of the sensor. In other words, the air bearing surface of MR sensor 50 is parallel to the plane of the page. MR sensor 50 includes MR layer or element 52, spacer layer 54, soft adjacent layer (SAL) 56, and first and second permanent magnets or permanent magnet layer regions 58 and 60.

MR element 52 includes first outer region 62, second outer region 64, and active or central region 66 which is positioned between outer regions 62 and 64. Permanent magnet region 58 has a first surface 59 and is positioned at least partially on top of first MR element outer region 62. Permanent magnet region 60 has a first surface 61 and is positioned at least partially on top of second MR element outer region 64. Gap region 67 is formed above MR element active region 66 and between permanent magnet regions 58 and 60.

Spacer layer 54 is positioned between permanent magnet regions 58 and 60 and on top of active region 66 of MR element 52. SAL 56 is positioned on top of spacer layer 54 such that SAL 56 is also at least partially located between permanent magnet regions 58 and 60. Gap region 67 of MR sensor 50 includes active region 66 of MR element 52, spacer layer 54, and at least portions of SAL 56. In preferred embodiments, SAL 56 has a first surface 57 which is substantially coplanar with surfaces 59 and 61 of first and second permanent magnet regions 58 and 60. Permanent magnet regions 58 and 0 act as boundaries or gap region 67 and make contact with spacer layer 54 and SAL 56 at junctions 68 and 70. Permanent magnet regions 58 and 60 also help to define active region 66 of MR element 52.

MR element 52 is, in preferred embodiments, a layer of permalloy. Permalloy is a name commonly used to identify any of a large number of highly magnetically permeable alloys containing a combination of nickel Ni and iron Fe. It must be noted that other magnetoresistive materials can be used instead of permalloy. In preferred embodiments, the resistivity of MR element 52 is between 20 and 35 $\mu\Omega$-cm. MR element 52 preferably has a thickness of between 150 and 500 angstroms (Å).

First and second permanent magnet regions 58 and 60 are preferably formed from a layer of high coercivity cobalt-platinum (CoPt). However, other ferromagnetic materials can be used instead of CoPt. The resistivity of permanent magnet regions 58 and 60 is preferably between 30 and 60 $\mu\Omega$-cm. In preferred embodiments, the thickness of permanent magnet regions 58 and 60 is between 200 and 600 angstroms (Å).

Spacer layer 54 is a non-magnetic layer of high resistivity material which is positioned between SAL 56 and active region 66 to prevent magnetic exchange coupling between these two layers. The resistivity of spacer layer 54 is preferably substantially higher than that of MR element 52 so that it does not shunt current away from active region 66 of MR element 52. In preferred embodiments, spacer layer 54 is a layer of tantalum Ta having a resistivity of at least 200 $\mu\Omega$-cm and a thickness of between 50 and 200 angstroms (Å).

SAL 56 is preferably a layer of ferromagnetic material such as nickel-iron-rhodium NiFeRh, nickel-iron-rhenium NiFeRe, or nickel-iron-chromium NiFeCr. The resistivity of SAL 56 is preferably at least 100 $\mu\Omega$-cm to reduce the shunting of current away from active region 66 of MR element 52. SAL 56 has a preferred thickness of between 100 and 400 angstroms.

First outer region 62 or MR element 52 is inhibited from magnetic rotation by first high coercivity, low permeability permanent magnet region 58. Second outer region 64 of MR element 52 is inhibited from magnetic rotation by second permanent magnet region 60. Therefore, very little magnetic flux is absorbed into outer regions 62 and 64. This in turn helps to provide a well-defined reader track width. There is no permanent magnet region above active region 66 of MR element 52, therefore, that region is not inhibited from magnetic rotation.

MR element 52 will naturally tend to form magnetization vector M along its long axis when it is formed. For purposes of explanation, it will be assumed that natural magnetization vector M of active region 66 (shown in FIG. 1) points from left to right in the plane of the page. Current density vector J is formed in MR element 52 as current passes through MR sensor 50 during its operation. It is assumed that current flows through MR sensor 50, and thus through MR element 52, from left to right in the plane of the page (shown in FIG. 1). Therefore, current density vector J in active region 66 points in the same direction as natural magnetization vector M in this example.

The resistance of MR element 52 will vary nearly linearly with the magnitude of magnetic flux entering MR element 52 when magnetization vector M and current density vector J form an angle of approximately 45 degrees. Thus, to achieve a nearly linear response from MR sensor 50, natural magnetization vector M of MR element 52 is rotated by forming SAL 56 above active region 66. The magnetic field of SAL 56 causes natural magnetization vector M of MR element 52 to be rotated approximately 45 degrees with respect to the direction of current density vector J (shown in FIG. 1).

Several advantages are obtained by placing permanent magnet regions 58 and 60 on top of a plane above MR element outer region 62 and 64, rather than on the sides of MR element 52 as is the case in the prior art MR sensor designs. First, this configuration removes the criticality of precise alignment of the conductors or contacts which connect MR sensor 50 to external circuitry. In many prior art designs, placement of the conductors defines the active region of the sensor. In contrast, central or active region 66 in MR sensor 50 is defined by permanent magnet regions 58 and 60.

Second, in MR sensor 50, very little magnetic flux is absorbed into first outer region 62 and second outer region 64 because these regions are hard biased or inhibited from magnetic rotation by exchange coupled permanent magnet regions 58 and 60. This design provides a well defined active region 66 of MR element 52, which results in a well defined reader track width. A well-defined reader track width provides the advantages of improved side reading and a good read profile.

A third advantage of placing permanent magnet regions 58 and 60 over MR element outer regions 62 and 64 is that MR element 52 helps to establish the proper magnetic orientation of permanent magnet regions 58 and 60 while the permanent magnet layer is deposited on top of the previously deposited MR layer. This aspect of the present invention is described in detail in co-pending PCT Patent Application No. PCT/US94/07064 and in the corresponding U.S. National Phase Patent Application Ser. No. 08/302,799 entitled SINGLE DOMAIN MR SENSORS USING PERMANENT MAGNET STABILIZATION, assigned to the assignee of the present invention and incorporated herein by reference.

Another advantage provided by MR sensor 50 of the present invention is the degree of planarity of upper surface 72 formed by surface 59 of first permanent magnet region 58, surface 57 of SAL 56, and surface 61 of second permanent magnet region 60. Each of layers 56, 58, and 60 extends to approximately the same height above a bottom surface of MR element 52, creating a substantially planar surface 72 on which to fabricate an inductive write head or transducer. This advantage is further facilitated by the fact that, in the design of MR sensor 50 shown in FIG. 1, the conductors do not define the active region of the sensor. Therefore, they can be fabricated away from gap region 67 and active region 66. The planarity of surface 72 allows the writer top pole, shown in FIG. 2, to be built on an essentially planar surface. Otherwise, surface 72, also shown in FIG. 2, would need to be planarized by other means, such as additional and potentially more complex fabrication steps, to accommodate the write gap layer.

Figure 2:
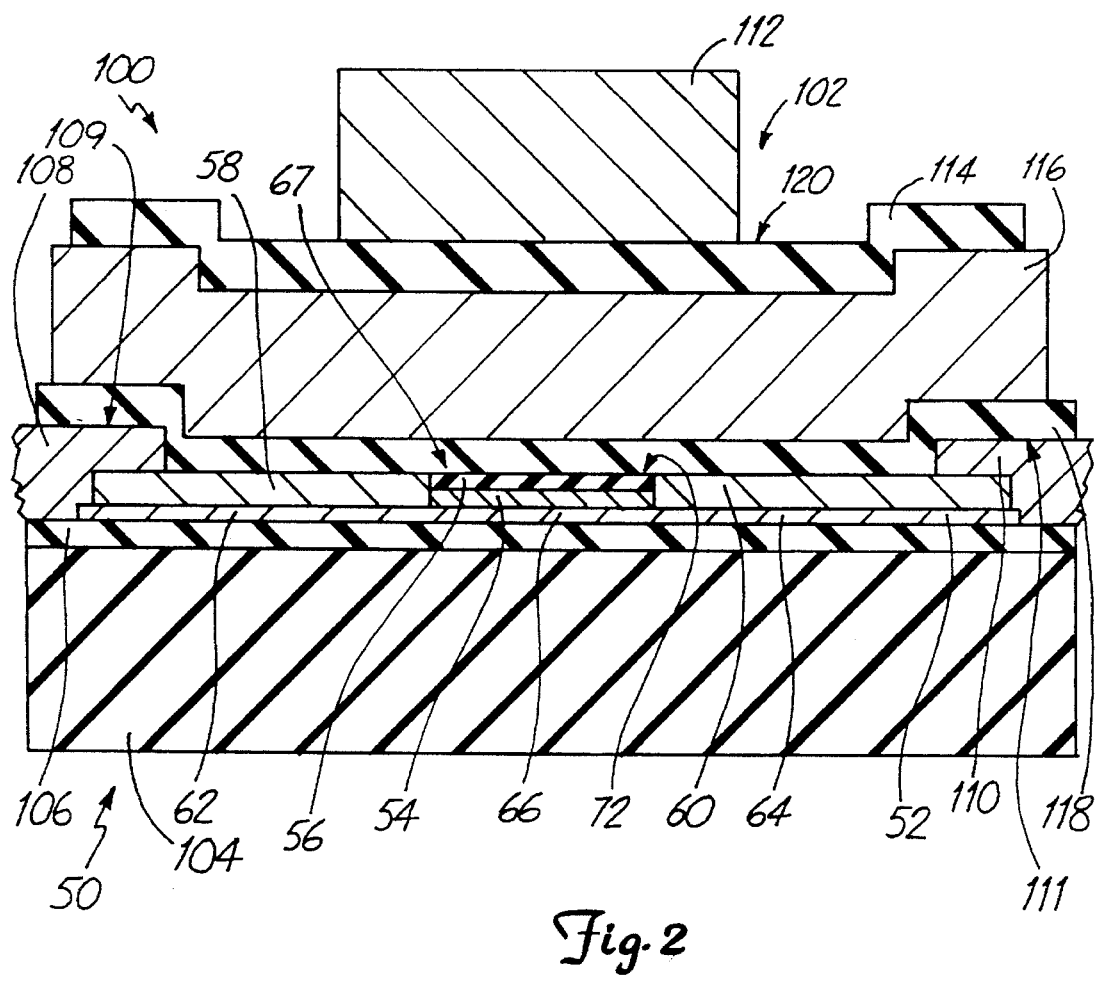
FIG. 2 is a sectional view of a first magnetic device having an inductive write head fabricated on top of an MR sensor in accordance with the present invention.

FIGS. 2–4 illustrate various embodiments of magnetic heads or devices which have inductive write heads or transducers fabricated on top of substantially planar surface 72 of MR sensor 50. FIG. 2 is a sectional view of magnetic device 100 which includes inductive write head 102 and MR read sensor 50. MR sensor 50 is substantially the same as described with reference to FIG. 1. MR sensor 50 is shown fabricated on top of shield layer 104 and insulating layer 106. Conductors or contacts 108 and 110 have been added to MR sensor 50 for connecting MR sensor 50 to bond pads and external circuitry. Write head 102 includes top pole layer 112, write gap layer 114, shared pole layer 116, and insulating layer 118. Layers 106 and 118 are referred to as reader "half-gaps."

As can be seen in FIG. 2, conductors 108 and 110 are positioned on top of permanent magnet regions 58 and 60, MR element outer regions 62 and 64, and layer 106. Conductors 108 and 110 are regions of a conductor layer which is typically between 1000 Å and 3000 Å thick. An important advantage of the design of MR head 50 of the present invention is that placement of conductors 108 and 110 away from the active region or central portion of MR sensor 50 allows the sensor to maintain substantially planar surface 72 on which layer 118 and subsequent layers of write head 102 can be deposited. Because permanent magnet regions 58 and 60 help to define active region 66 of MR element 52, conductors 108 and 110 need not be deposited near the central portion of MR sensor 50. This is in contrast to prior art MR sensor designs in which conductors 108 and 110 would be placed further inward from the sides of MR sensor 50 in order to help define active region 66 of MR element 52. If conductors 108 and 110 overlapped the other layers of MR sensor 50 so as to help define active region 66 of MR element 52 near the air bearing surface, the advantages of having planar surface 72 would become much less relevant because the layers in the central portion of write head 102 would be fabricated on a non-planar surface made up of individual surfaces 109 of conductor 108, surface 72 of MR sensor 50, and surface 111 of conductor 110.

The planarity of surface 72 allows the central portion of layer 118 to be formed upon an essentially flat surface. This correspondingly allows the central portions of shared pole 116 and write gap layer 114 to be formed upon essentially flat surfaces, so that top pole 112 can be formed on a truly flat surface. Shared pole 116 is now flat at the edges of the track, as opposed to rising over the contacts at the edge of the track as in previous designs. This results in improved side reading characteristics.

FIG. 3 is a sectional view of magnetic device 150 which includes inductive write head 102 and MR sensor 50. Magnetic device 150 is similar to magnetic device 100 except for the addition of insulation layers 152 and 154. Insulation layers 152 and 154 are positioned between shared pole 116 and layer 118 of write head 102. The purpose of insulation layers 152 and 154 is to improve the shield short yield of the device. Insulation layers 152 and 154 can be added in accordance with preferred embodiments of the present invention because, as discussed above, the features of MR sensor 50 allows conductors 108 and 110 to be moved outward from the central or active region of the sensor. Because conductors 108 and 110 have been removed from the active region of MR sensor 50, insulation layers 152 and 154 can be added without disrupting the planar surface on which write head 102 is preferably fabricated.

FIG. 4 is a sectional view of magnetic device 200 which also includes inductive write head 102 and MR sensor 50. However, in magnetic device 200, MR element 52 and permanent magnet regions 58 and 60 have been widened to extend farther outward along the air bearing surface and under conductors 108 and 110. Extending the permanent magnet and magnetoresistive layers further under conductors 108 and 110 provides fabrication process advantages. Moreover, extending the permanent magnet and magnetoresistive layers under conductors 108 and 110 helps to reduce the overall resistance of MR sensor 50 since these layers will be in parallel with the conductors in the overlapped areas.

FIG. 5 illustrates an alternate embodiment of an MR sensor configuration which can be used in conjunction with preferred embodiments of the present invention. MR sensor 250 still is similar to MR sensor 50 shown in FIG. 1. MR sensor 250 includes permanent magnet regions 58 and 60 fabricated on top of MR element outer regions 62 and 64, respectfully. Spacer layer 54 and SAL 56 are once again fabricated in gap region 67 above active region 66 of MR element 52.

A difference between MR sensor 250 and MR sensor 50 is that MR sensor 250 includes a layer 252, 254 of low resistivity material fabricated on top of permanent magnet regions 58 and 60 to reduce the overall resistance of MR sensor 250. Permanent magnet regions 58 and 60 are as thin as possible while maintaining sensor stability. Low resistivity regions 252 and 254 are in parallel with permanent magnet regions 58 and 60 and with MR element 52. Low resistivity region 252 is fabricated on top of surface 59 of permanent magnet region 58. Low resistivity region 254 is fabricated on top of surface 61 of permanent magnet region 60. Surfaces 253 and 255 of low resistivity regions 252 and 254 are substantially coplanar with surface 57 of SAL 56 so that surface 67 of MR sensor 250 remains substantially planar as in MR sensor 50. The configuration of MR sensor 250 maintains the advantages of having an MR sensor with a substantially planar surface on which to deposit an inductive write head, while providing an MR sensor with an overall reduced resistance. In preferred embodiments, low resistivity region 252 and 254 are formed from a layer of tungsten W or molyboenum Mo.

FIGS. 6–11 illustrate a preferred process of forming MR sensor 50 according to the present invention. The cross-sectional views of FIGS. 6–11 are taken from a plane parallel to the air bearing surface of the sensor. In other words, as is the case with FIG. 1, the air bearing surface of MR sensor 50 is in a plane parallel to the plane of the page.

To construct MR sensor 50 as shown in FIG. 1, MR element layer 52 of FIG. 6 is deposited on a gap material 300. As shown in FIGS. 2–4, gap material 300 is typically a non-transducing or an insulating layer on a hard wafer. After deposition of MR element 52, spacer layer 54 is deposited on top of MR element layer 52. Next, SAL 56 is deposited on top of spacer layer 54. SAL 56, spacer layer 54 and MR element 52 are frequently referred to as the "tri-layer". Alter deposition of the tri-layer, photoresist 302 is patterned on top of SAL 56 to define what will eventually be the active region of MR element 52 and to define what will eventually be the gap region above the active region. Permanent magnet material will eventually be applied to the areas not covered by photoresist 302, and the central region of MR sensor 50 covered by photoresist 302 will become the active region.

In FIG. 8, the structure has been subjected to various processes for removing portions of spacer layer 54 and SAL 56 which are not covered by photoresist 302. First, SAL 56 is subjected to an ion-milling process to remove those portions of SAL 56 not covered by photoresist 302. Next, spacer layer 54 is subjected to a reactive ion-etch process to remove those portions of spacer layer 54 not covered by photoresist 302. Finally, MR element outer regions 62 and 64 are sputter-etched to remove approximately 30 Å of the MR element layer in order to establish a clean surface for later deposition of the permanent magnet layer. Because active region 66 of MR element 52 is protected by photoresist 302, as well as by SAL 56 and spacer layer 54, surface 306 of the active region is not sputter-etched and therefore, will be slightly higher than surfaces 304 and 305 of outer regions 62 and 64.

In FIG. 9, permanent magnet layer 308 has been sputter-deposited over the entire structure. Layer 308 is preferably a layer of CoPt, but any permanent magnet material with in-plane magnetization and high coercivity may be used. After permanent magnet layer 308 is deposited over the entire structure, photoresist 302 is removed with a "lift-off" process. Typically, a solvent such as acetone is applied to the structure. The solvent penetrates small cracks in permanent magnet 308 and dissolves photoresist 302 out from under layer 308. Once photoresist layer 302 is removed, the portions of layer 308 that are not supported from underneath are broken off during the "lift-off" process, as shown in FIG. 10. Therefore, after removing photoresist 302, only permanent magnet regions 58 and 60 remain.

Upper surface 59 of permanent magnet region 58 and upper surface 61 of permanent region 60 should be approximately the same height above substrate 300 or MR element 52 as surface 57 of SAL 56. If surfaces 57, 59 and 61 are at similar heights above substrate 300, surface 72 of MR sensor 50 will be substantially planar, and therefore well adapted for fabrication of an inductive write head on top of MR sensor 50. Differences in height between surfaces 57, 59 and 61 should preferably not exceed 500 Å.

FIG. 11 illustrates MR sensor 50 after conductors 108 and 110 have been deposited. Because permanent magnet regions 58 and 60 define active region 66, conductors 108 and 110 can be deposited on permanent magnet regions 58 and 60 away from active region 67 and gap region 67. Conductors 108 and 110 can be deposited in positions which are on the air bearing surface but which are retracted from the active and gap regions in directions parallel to the air bearing surface. Conductors 108 and 110 can also be moved back from the air bearing surface in a direction perpendicular to the air bearing surface. These options help to maintain substantially planar surface 72 on which the write head is to be fabricated.

Figure 12:
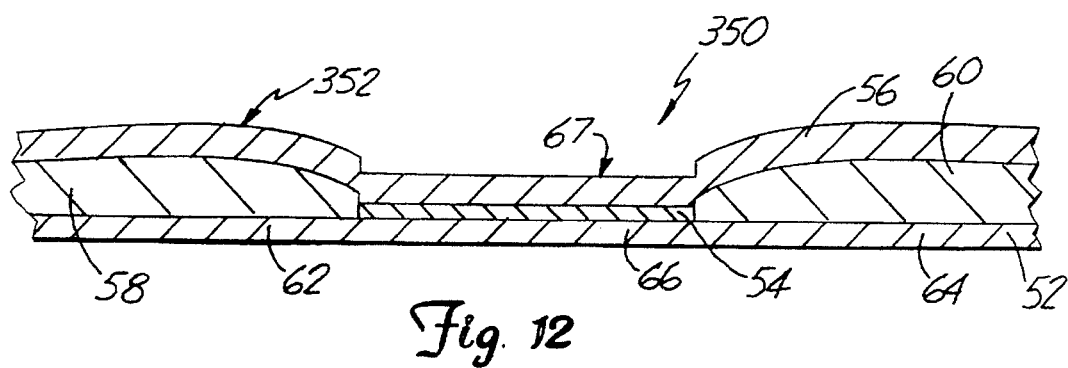
FIG. 12 is sectional view of a third MR sensor configuration in accordance with preferred embodiments of the preferred invention.

FIG. 12 illustrates an alternate embodiment of an MR sensor according to preferred embodiments the present invention. MR sensor 350 overcomes a deficiency which can exist in MR sensor designs discussed thus far. In fabrication of an MR sensor, such as MR sensor 50 shown in FIG. 1, it is difficult to establish a good electrical contact between the permanent magnet regions 58 and 60 and SAL 56 and/or spacer layer 54. Typically, because of limitations in the process of depositing permanent magnet regions 58 and 60, junction regions 68 and 70 shown in FIG. 1 do not necessarily provide consistent physical and electrical contact between the permanent regions and the SAL and/or spacer layers. Therefore, junction regions 68 and 70 do not provide good electrical contact between these layers. As a result, current flowing from left to right through permanent magnet region 58 will be forced to travel down into MR element 52 in region 74 immediately below junction 68. After passing through region 74, the current is once again split and flows through region 66 and through spacer layer 54 and SAL 56 in active region 67. At junction 70, most of the current will once again flow into MR element 52 as it passes through region 76.

Because all the current flowing through MR sensor 50 passes through regions 74 and 76 of MR element 52, these regions of MR element 52 experience much higher current densities than other portions of MR element 52. Regions 74 and 76, also referred to as "hot spots", may experience a much higher failure rate than other portions of MR sensor 50 as a result of the high current densities in these portions of MR element 52.

MR sensor 350 shown in FIG. 12 overcomes the "hot spot" problem experienced by many MR sensor designs. Like MR sensor 50, MR sensor 350 includes MR clement 52, spacer layer 54, SAL 56, and permanent magnet regions 58 and 60. Permanent magnet regions 58 and 60 are again deposited on first and second outer regions 62 and 64 of MR element 52. Spacer layer 54 is once again deposited on active region 66 of MR element 52. SAL 56 is at least partially deposited on spacer layer 54 in active region 67 between permanent magnet regions 58 and 60.

The main difference between MR sensor 350 shown in FIG. 12 and MR sensor 50 shown in FIG. 1 is that, in MR sensor 350, SAL 56 is not deposited only on top of spacer layer 54. In MR sensor 350, SAL 56 is a continuous layer extending over at least portions of permanent magnet regions 58 and 60. In the embodiment shown in FIG. 12, SAL 56 extends over substantially all of permanent magnet regions 56 and 60. Although SAL 56 is shown in FIG. 12 to extend in a direction parallel to the air bearing surface over the entire width of permanent magnet regions 58 and 60, in other embodiments, SAL 56 extends in the same direction, but only partially overlaps permanent magnet regions 58 and 60.

The advantages of MR sensor 350 over prior art MR sensor designs is that, as current flows from left to right through MR sensor 350, a second continuous current path is formed without having to pass through "vertical" junction regions such as 68 and 70 of MR sensor 50 shown in FIG. 1. Since current can flow through the entire width of MR sensor 350 in both SAL 56 and MR element 52, a more constant current density will be achieved in MR element 52, even if a good electrical contact is not achieved in vertical junction regions between permanent magnet regions 58 and 60 and spacer layer 54. In embodiments in which SAL 56 only partially overlaps permanent magnet regions 58 and 60, the improved result will still be achieved. This is true because better electrical contact can be achieved between overlapping layers than can be achieved in vertical junction regions between adjacent layers such as permanent magnet regions 58 and 60 and spacer layer 54.

A substantially planar surface of MR sensor 350 can be obtained in a number of different ways. The most desirable method of obtaining a substantially planar MR sensor 350 surface is to deposit permanent magnet regions 58 and 60 such that they have a thickness which is within 500 Å of the thickness of spacer layer 54, and preferably within 100 Å of the thickness of spacer layer 54. Since the thickness of SAL 56 will be substantially constant, if the thicknesses of permanent magnet regions 58 and 60 and of spacer layer 54 are within 500 Å of each other, surface 352 of MR sensor 350 will be within 500 Å of being planar. However, it is preferable that the thickness of spacer layer 54 be significantly less than the thickness of permanent magnet regions 58 and 60. In this instance, at least part of SAL 56 will be fabricated in the region between permanent regions 58 and 60.

Figure 13:
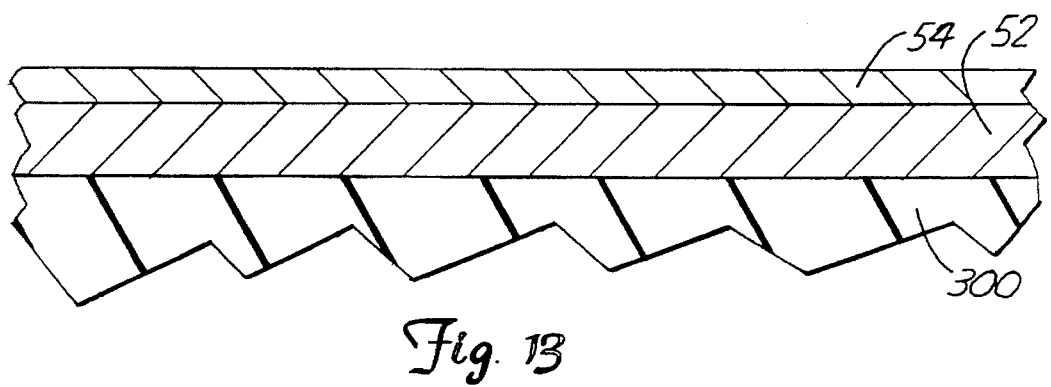
FIGS. 13–19 are cross-sectional views showing a method of forming the MR sensor of FIG. 12.
Figure 14:
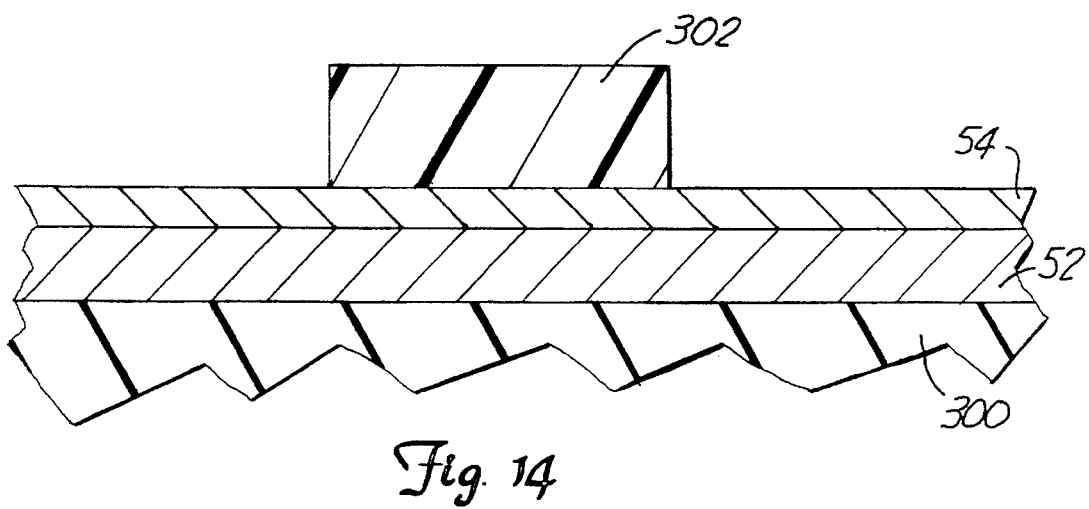

FIGS. 13–19 illustrate a preferred process of forming MR sensor 350 according to the present invention. The cross-sectional views of FIGS. 13–19 are taken from a plane parallel to the air bearing surface of the sensor. In other words, the air bearing surface of MR sensor 350 is in a plane parallel to the plane of the page. To construct MR sensor 350 as shown in FIG. 12, MR element layer 52 is deposited on gap material 300. After deposition of MR element 52, spacer layer 54 is deposited on top of MR element layer 52. The combination of MR element 52 and spacer layer 54 shown in FIG. 13 is sometimes referred to as a bi-layer.

After deposition of the bi-layer, photoresist layer 302 is patterned on top of spacer layer 54 to define the active region of MR element 52 and to define what will eventually be a gap region between the permanent magnets. As was the case in the construction MR sensor 50, permanent magnet material will eventually be applied to the areas not covered by photoresist 302.

Figure 15:
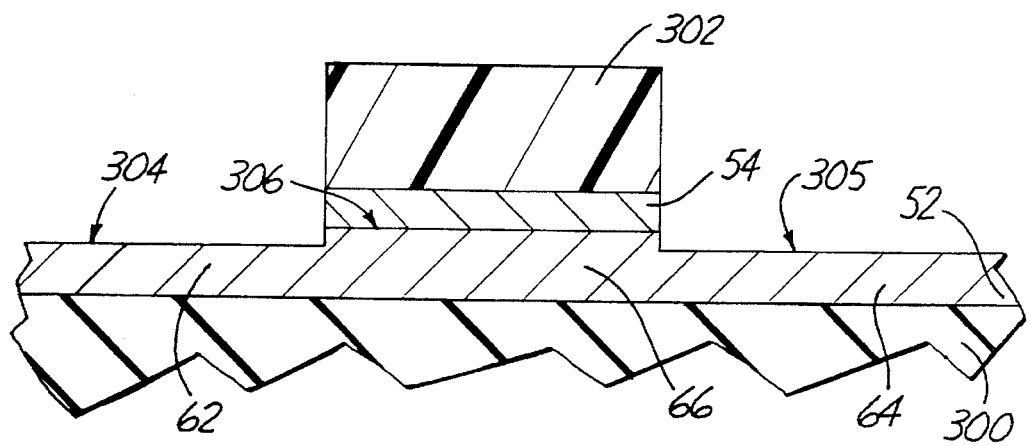

In FIG. 15, portions of spacer layer 54 which were not covered by photoresist 302 have been removed by a reactive ion-etch process. MR element outer regions 62 and 64 have subsequently been sputter-etched to remove 30 Å or more of the MR element layer in order to establish clean surfaces 304 and 305 for later deposition of the permanent magnet layer.

Figure 16:
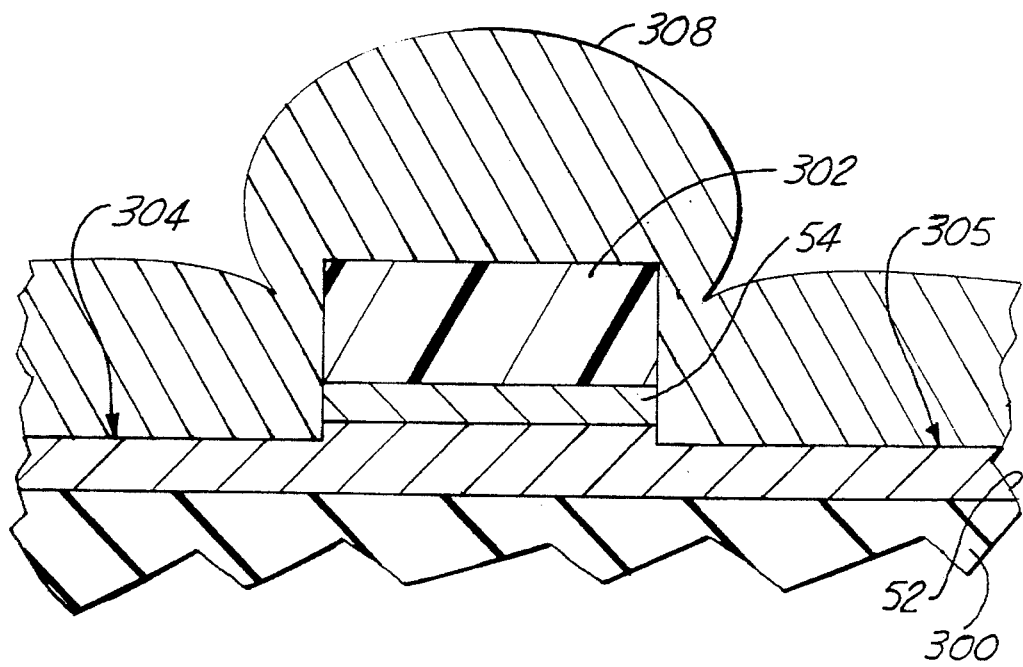
Figure 17:
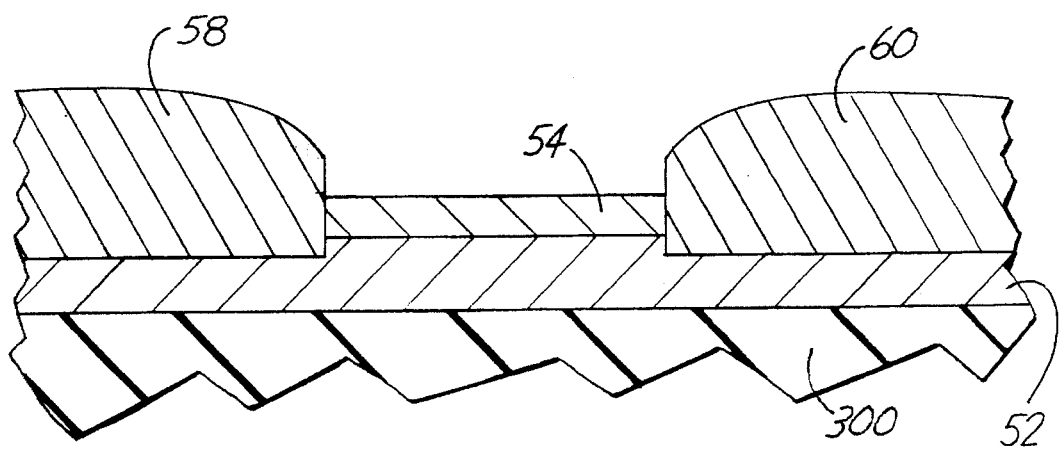
Figure 18:
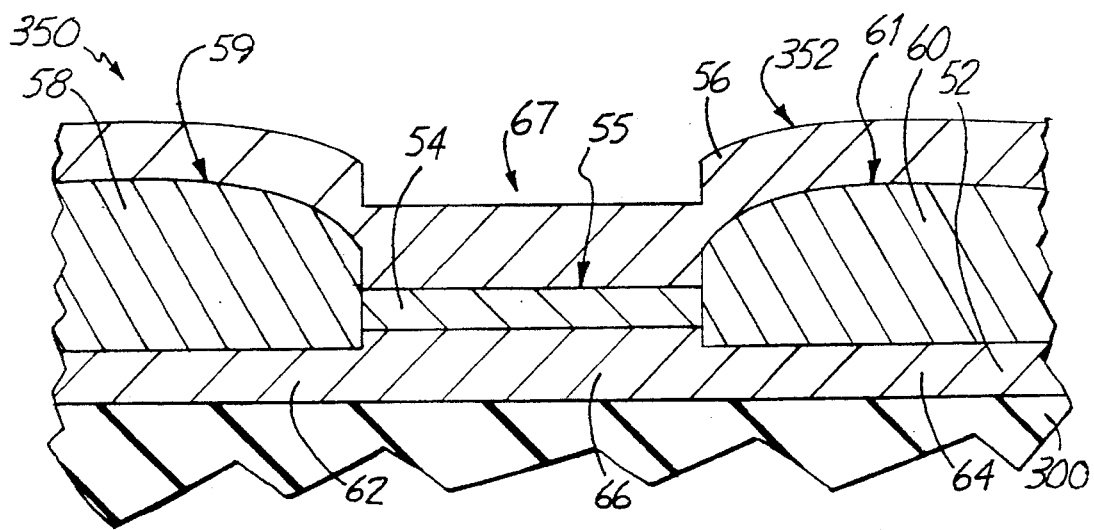
Figure 19:
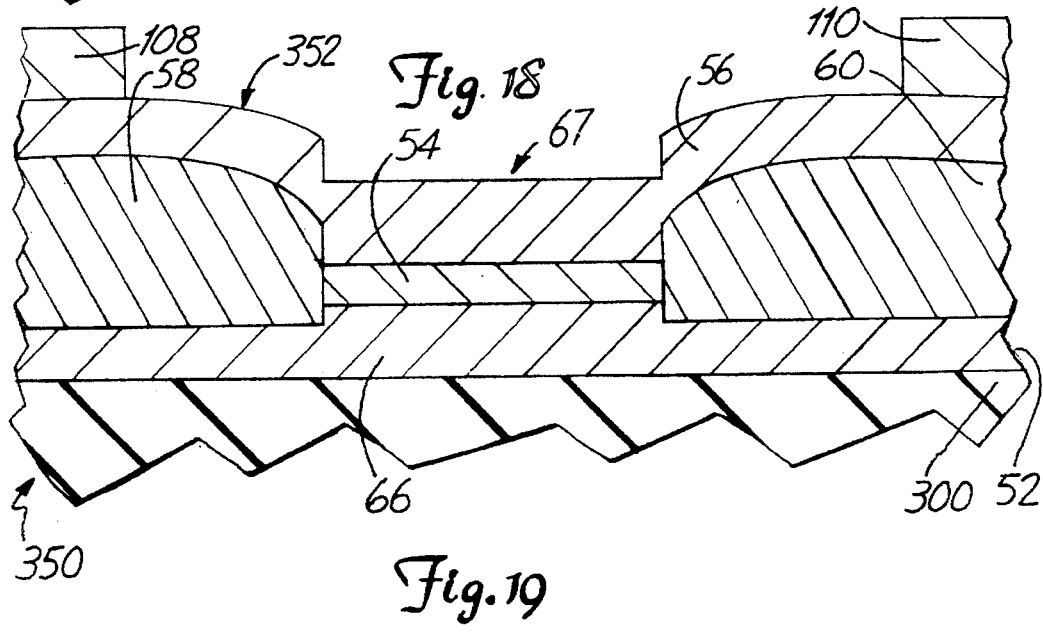

In FIG. 16, permanent magnet layer 308 has been deposited over the entire structure to a thickness slightly greater, but not more than 500 Å greater than, spacer layer 54 plus the depth of the sputter etching of the MR element discussed above. This factor once again helps to maintain a planar surface upon which the inductive write head can be fabricated. After permanent magnet layer 308 has been deposited over the entire structure, photoresist 302 is removed with a "lift-off" process, and a portion of layer 308 is broken away leaving the structure illustrated in FIG. 17. In FIG. 18, continuous SAL 56 has been deposited upon surfaces 59 and 61 of permanent magnet regions 58 and 60 and upon surface 55 of spacer layer 54. Continuous SAL 56 of MR sensor 350 aids in reducing hot spots or high current density regions in MR element 52. Finally, in FIG. 19 conductors 108 and 110 have been deposited on SAL 56 away from active region 67. Thus, active region 67 is defined by permanent magnet regions 58 and 60, rather than by the conductors.

FIG. 20 illustrates an advantageous feature of methods of forming MR sensor 400 in accordance with preferred embodiments of the present invention. More particularly, FIG. 20 illustrates a fabrication process feature of the present invention by which critical alignments between mask features and lap lines are eliminated. Like MR sensors 50 and 350 discussed above, MR sensor 400 has a tri-layer region 402 which includes an MR element layer, a spacer layer and a SAL. MR sensor 400 also includes regions 404 which contain at least permanent magnet and magnetoresistive layers, and which can include other layers. Mask 406 is used to define the portions of MR sensor 400 that will be removed during an ion-milling process. Lap line 410 defines how much of MR sensor 400 will be removed from side 409 during a mechanical lapping process.

Mask 406 defines top and bottom edges 407 and 408 of portions of the tri-layer which are to remain. Other portions of tri-layer 402 and regions 404 are removed during the ion-milling process. Subsequently, lapping sensors define lap line 410 to control how much of the sensor, including how much of the tri-layer and MR element, is removed during the lapping process. The lapping process removes portions of sensor 400 below lap line 410. When the lapping process is complete, active region 412 of MR sensor 400 is left, with the air bearing surface defined by lap line 410.

In prior art MR head designs, misalignment between mask 406 and lap line 410 resulted in a non-constant height of MR sensor active region 412. Because a constant height of active region 412 is highly advantageous, alignment between mask 406 and lap line 410 was a critical process step. In the present invention, mask 406 and lap line 410 are defined simultaneously or in the same step. The distance between boundary 407 of mask 406 and lap line 410 is therefore easily controlled. By defining mask 406 and lap line 410 in the same step, the height of active region 412 is closely controlled and aligning mask 406 and lap line 410 is therefore no longer a critical process step.

FIG. 21 illustrates additional MR sensor features in accordance with preferred embodiments of the present invention. MR sensor 450 has a tri-layer region 452 which includes active region 66 of the magnetoresistive layer, spacer layer 54, and at least portions of SAL 56. Regions 454 and 456 are also multiple layer regions of MR sensor 450. Region 454 includes at least outer region 62 of MR element 52 and permanent magnet region 58. Region 456 includes at least outer region 64 of MR element 52 and permanent magnet region 60. Depending upon the particular MR sensor configuration, multiple layer regions 454 and 456 can also include portions of a continuous SAL and/or portions of low resistivity layers 252 and 254 as shown in FIG. 5. Also, in some embodiments, multiple layer regions 454 and 456 include portions of the conductor layers of the MR sensor. Regions 458 and 460 of MR sensor 450 include at least conductor layer regions 108 and 110 for connecting MR sensor 450 to bond pads 462 and 464. Bond pads 462 and 464 in turn connect MR sensor 450 to external circuitry.

In some preferred embodiments of the present invention, one or more of the MR layer, the permanent magnet layer, the SAL, and the layer of low resistivity material are extended from multiple layer regions 454 and 456 into regions 458 and 460. In fact, these layers can be extended toward, or all the way to, bond pads 462 and 464. Extending these layers toward bond pads 462 and 464 is equivalent to extending them in a direction away from and perpendicular to air bearing surface 466. By extending these layers of relatively low resistivity material underneath conductors 108 and 110 in regions 458 and 460, the resistances of the various layers are connected in parallel with the conductor layers, and thus, the overall resistance of MR sensor 450 is reduced.

As can be seen in FIG. 21, in some preferred embodiments of the present invention, the conductors in regions 458 and 460 are recessed from the active region (outward toward the sides of the page) of MR element 52 and gap region 67 in directions parallel to air bearing surface 466 of the sensor. This once again allows MR sensor 450 to supply a substantially planar surface on which an inductive write head can be deposited. Since the conductors do not define the active region, and since their placement is no longer critical, the conductors can not only be moved away from the active region of the MR sensor, but they can also be moved away from the air bearing surface. In other words, conductor layer regions 108 and 110 can be recessed back from the air bearing surface in a direction perpendicular to the air bearing surface so that these layers do not extend beyond regions 458 and 460 as shown in FIG. 21.

The reliability reasons for recessing the conductors away from the air bearing surface include protection of the conductors from corrosion which can occur at the air bearing surface and definition of a planar read gap near the active region of the sensor. However, in other embodiments, the conductors are extended toward the air bearing surface to reduce the overall resistance of the MR sensor. The present invention allows the conductors to be placed in either position while the sensor maintains a substantially planar surface.

In other preferred embodiments, the conductor layer, the permanent magnet layer, and the MR layer are tapered in regions 468 and 470 at an angle back from air bearing surface 466. This provides several advantages. It is desirable to place as little material as possible on air bearing surface 466 for reliability reasons. Also, reducing the exposure of the various layers to air bearing surface 466 minimizes inductive pickup of the MR sensor.

Although the present invention has been described with reference to preferred embodiments, workers skilled in the art will recognize that changes may be made in form and detail without departing from the spirit and scope of the invention.

What is claimed is:

1. A magnetic device comprising:
   a magnetoresistive layer comprising:
      a first outer region;
      a second outer region; and
      a central region located between the first and second outer regions;
   a permanent magnet layer which at least partially defines an active region of the magnetic device, the active region including the central region of the magnetoresistive layer, the permanent magnet layer comprising:
      a first permanent magnet region formed upon the first outer region of the magnetoresistive layer and defining a first boundary of the active region; and
      a second permanent magnet region formed upon the second outer region of the magnetoresistive layer and defining a second boundary of the active region such that at least a portion of the active region is positioned between the first and second permanent magnet regions;
   a spacer layer formed in the active region on the central region of the magnetoresistive layer; and
   a soft adjacent layer formed in the active region and upon the spacer layer such that a portion of the soft adjacent layer is positioned between the first and second permanent magnet regions.

2. The magnetic device of claim 1 wherein the first permanent magnet region, the second permanent magnet region and the soft adjacent layer each has a surface that is substantially coplanar with one another.

3. The magnetic device of claim 1 wherein the first permanent magnet region, the second permanent magnet region and the soft adjacent layer each has a surface that is within 500 Å of being coplanar with one another.

4. The magnetic device of claim 1 and further comprising:
   a conductor layer for electrically coupling the magnetic device to an external circuit, the conductor layer comprising:
      a first conductor region formed at least partially upon the first permanent magnet region; and
      a second conductor region formed at least partially upon the second permanent magnet region.

5. The magnetic device of claim 4 wherein each of the first and second conductor regions are positioned along the air bearing surface of the device a substantial distance from the respective first and second boundaries of the active region.

6. The magnetic device of claim 4 wherein each of the first and second conductor regions extends away from the air bearing surface of the device to a corresponding bond pad which connects the conductor layer to the external circuit, and wherein at least one of the magnetoresistive layer, the permanent magnet layer and the soil adjacent layer extends under the conductor layer away from the air bearing surface of the device to a position near the bond pads in order to minimize the resistance of the device.

7. The magnetic device of claim 1 wherein the soft adjacent layer is formed partially upon the first and second permanent magnet regions to provide a continuous current path between points beyond each of the first and second boundaries of the active region.

8. The magnetic device of claim 1 wherein the soft adjacent layer is formed partially upon the first and second permanent magnet regions such that it extends beyond the first and second boundaries of the active region parallel to the air bearing surface of the device.

9. The magnetic device of claim 1 wherein the first and second outer regions of the magnetoresistive layer extend from the air bearing surface in a direction perpendicular to the air bearing surface such that the first and second outer regions of the magnetoresistive layer are increasingly tapered at an angle away from the air bearing surface to minimize exposure of the MR layer to the air bearing surface.

10. A magnetoresistive sensor comprising:
a magnetoresistive layer comprising:
a first outer region;
a second outer region; and
an active region located between the first and second outer regions; a spacer layer formed upon the active region of the magnetoresistive layer; a soft adjacent layer having a top surface and being formed upon the spacer layer; and
a permanent magnet layer comprising:
a first permanent magnet having a top surface and being formed upon the first outer region of the magnetoresistive layer; and
a second permanent magnet having a top surface and being formed upon the second outer region of the magnetoresistive layer, wherein the top surface of the first permanent magnet, the top surface of the second permanent magnet and the first surface of the soft adjacent layer are substantially coplanar with one another.

11. The magnetoresistive sensor of claim 10 wherein the top surface of the first permanent magnet, the top surface of the second permanent magnet, and the top surface of the soft adjacent layer are within 500 Å of being coplanar with one another.

12. A magnetoresistive sensor comprising:
a magnetoresistive layer comprising:
a first outer region;
a second outer region; and
an active region located between the first and second outer regions;
a spacer layer formed upon the active region of the magnetoresistive layer;
a soft adjacent layer having a top surface and being formed upon the spacer layer;
a permanent magnet layer comprising:
a first permanent magnet region formed upon the first magnetoresistive layer outer region; and
a second permanent magnet region formed upon the second magnetoresistive layer outer region; and
a layer of low resistivity material comprising:
a first region of low resistivity material having a top surface and being formed upon the first permanent magnet region; and
a second region of low resistivity material having a top surface and being formed upon the second permanent magnet region, wherein the top surface of the first region of low resistivity material, the top surface of the second region of low resistivity material and the top surface of the soft adjacent layer are substantially coplanar with one another.

13. The magnetoresistive sensor of claim 12 wherein the resistivity of the first and second regions of low resistivity material is less than the resistivity of the permanent magnet layer.

14. In a magnetoresistive sensor having a magnetoresistive layer, a spacer layer over an active portion of the magnetoresistive layer, a soft adjacent layer over the spacer layer and first and second permanent magnets on outer portions of the magnetoresistive layer, the soft adjacent layer forming a planar surface remote from the spacer layer, characterized in that the first and second permanent magnets form a planar surface remote from the magnetoresistive layer that is substantially coplanar with the planar surface of the soft adjacent layer remote from the spacer layer.

15. In a magnetoresistive sensor having a magnetoresistive layer, a spacer layer over an active portion of the magnetoresistive layer, a soft adjacent layer over the spacer layer, first and second permanent magnets on outer portions of the magnetoresistive layer abutting the spacer layer and abutting the soft adjacent layer, and first and second contacts on the respective first and second permanent magnets, characterized in that the first and second contacts are remote from the active portion of the magnetoresistive layer.

* * * * *

UNITED STATES PATENT AND TRADEMARK OFFICE
CERTIFICATE OF CORRECTION

PATENT NO. : 5,495,378

DATED : February 27, 1996

INVENTOR(S) : PETER I. BONYHARD, JAMES F. DOLEJSI, CHARLES H. TOLMAN, WILLIAM P. WOOD

It is certified that error appears in the above-indentified patent and that said Letters Patent is hereby corrected as shown below: Item [54] and col. 1, In the title, delete "MAGNETORESISTIVE SENSOR WITH IMPROVED PERFORMANCE AND PROCESSABILITY", Insert --PERMANENT MAGNET STABILIZED MAGNETORESISTIVE SENSOR HAVING SOFT ADJACENT LAYER IN THE ACTIVE REGION--

Col. 1, line 60, delete "aligmnent", insert --alignment--

Col. 3, line 59, delete "regions 58 and 0 act as boundaries or", insert --regions 58 and 60 act as boundaries of--

Col. 4, line 33, delete "or", insert --of--

Col. 4, line 43, delete "clement", insert --element--

Col. 7, line 36, delete "alter", insert --After--

UNITED STATES PATENT AND TRADEMARK OFFICE
CERTIFICATE OF CORRECTION

PATENT NO. : 5,495,378
DATED : February 27, 1996
INVENTOR(S) : Bonyhard et al.

It is certified that error appears in the above-indentified patent and that said Letters Patent is hereby corrected as shown below:

Col. 8, line 61, delete "clement", insert --element--.

Col. 9, line 23, delete "clement", insert --element--.

Col. 12, line 52, delete "soil", insert --soft--.

Signed and Sealed this

Thirteenth Day of August, 1996

Attest:

BRUCE LEHMAN

*Attesting Officer*    *Commissioner of Patents and Trademarks*